United States Patent [19]
McIntyre

[11] Patent Number: 5,512,263
[45] Date of Patent: Apr. 30, 1996

[54] METHOD FOR CHEMICAL SYNTHESIS EMPLOYING A COMPOSITE MEMBRANE

[75] Inventor: James A. McIntyre, Midland, Mich.

[73] Assignee: The Dow Chemical Company, Midland, Mich.

[21] Appl. No.: 239,017

[22] Filed: May 6, 1994

[51] Int. Cl.$^6$ ................................................ C01B 15/01
[52] U.S. Cl. ................................................ 423/584
[58] Field of Search ........................... 204/282, 283, 204/296, 252, 263, 266; 429/30, 33; 501/27; 423/584; 422/129; 210/500.1; 96/4

[56] References Cited

U.S. PATENT DOCUMENTS

| | | | |
|---|---|---|---|
| 3,630,879 | 12/1971 | Spacil et al. | 204/248 |
| 4,328,086 | 5/1982 | Takenaka et al. | 204/296 |
| 4,330,633 | 5/1982 | Yoshisato et al. | 501/152 |
| 4,364,803 | 12/1982 | Nidola et al. | 204/30 |
| 4,832,938 | 5/1989 | Gosser et al. | 423/584 |
| 4,846,977 | 7/1989 | De Vellis et al. | 210/640 |
| 4,911,803 | 3/1990 | Kunz | 204/296 |
| 5,273,628 | 12/1993 | Liu et al. | 204/59 R |
| 5,306,411 | 4/1994 | Mazanec et al. | 204/265 |
| 5,342,494 | 8/1994 | Shane et al. | 204/252 |

FOREIGN PATENT DOCUMENTS

| | | |
|---|---|---|
| 0345393 | 12/1989 | European Pat. Off. . |
| 0438902 | 7/1991 | European Pat. Off. . |

OTHER PUBLICATIONS

Otsuka et al., "One Step Synthesis of Hydrogen Peroxide through Fuel Cell Reaction"; Electrochim. vol. 35, No. 2, pp. 319–322, 1990 no month available.

Langer et al., "Chemicals With Power," Chemtech 226, 229 (Apr. 1985).

Spillman et al., "Why Not Make Chemicals in fuel Cells?", Chemtech 176, 182 (Mar. 1984).

Martin et al., "Dissolution of Perfluorinated Ion Containing Polymers," 54 Analytical Chemistry 1639 (1982) * no month available.

Appleby et al., "Electrocatalysis of Hydrogen," *Fuel Cell Handbook 322–35 (Van Nostrand Reinhold 1989) no month available.*

Putten et al., J. Chem. Soc. Chem. Commun. 477 (1986) no month available.

Cook et al., 137 (No. 6) J. Electrochem. Soc. 200 (Jun. 1990).

Chan et al., 105 J. Am. Chem. Soc. 3713–14 (1983) no month available.

Degrand, 169 J. Electroanal. Chem. 259–68 (1984) no month available.

*Primary Examiner*—Kathryn Gorgos
*Attorney, Agent, or Firm*—John B. Treangen

[57] ABSTRACT

This invention is a composite membrane for chemical synthesis, a method of using the composite membrane, and a chemical reactor into which the composite membrane might be incorporated. The composite membrane comprises a multiphase conducting path having both a cation conductive phase and an electron conductive phase. Surfaces of the composite membrane can be supplied with appropriate catalyst layers in order to increase favorability of a given reaction. By placing appropriate composition(s) in contact with each surface of the composite membrane, cations and electrons are conducted from one surface through the composite membrane to the other surface in order to form reaction products without the use of an external electrical circuit. A chemical reactor utilizing this composite membrane may safely react such elements as $H_2$ and $O_2$ to form $H_2O_2$ at room temperature without input of external electricity or use of complex electrical equipment or organic solvents.

12 Claims, No Drawings

METHOD FOR CHEMICAL SYNTHESIS EMPLOYING A COMPOSITE MEMBRANE

BACKGROUND OF THE INVENTION

This invention pertains to a composite membrane for chemical synthesis, a method of using the composite membrane, and a chemical reactor into which the composite membrane is incorporated.

The primary purpose of fuel cells is to generate electrical energy. Certain fuel cells use ion-exchange membrane composites. Chemical energy is converted into electrical energy by reacting different gases at catalytic metal surfaces located on anodes and cathodes which are positioned on opposite sides of the ion exchange membrane. Using hydrogen/ oxygen solid electrolyte fuel cells as illustrative, hydrogen is introduced via a first gaseous stream to an anode side of the ion exchange membrane and is electrochemically oxidized in the presence of a suitable catalyst, such as platinum, in accordance with the following general reaction:

$$H_2 \rightarrow 2H^+ + 2 \text{ electrons}.$$

Protons, liberated during the electrochemical oxidation of the hydrogen, are selectively transported through the ion exchange membrane to a cathode side. Electrons, generated at the anode, are collected and transported to the cathode side via a complex current collector and external circuit system. The collector and external circuit system are constructed of any suitable electrically conductive material such as a stable metal or carbon black.

On the cathode side of the fuel cell, oxygen is introduced by way of a second gaseous stream and is electrochemically reduced in accordance with the following general complete combustion reaction:

$$O_2 + 4H^+ + 4 \text{ electrons} \rightarrow 2H_2O.$$

However, a partial combustion product, hydrogen peroxide ($H_2O_2$), may also form. The equation of this reaction is:

$$O_2 + 2H^+ + 2 \text{ electrons} \rightarrow H_2O_2.$$

In fuel cells, where the aim is maximum production of electricity and complete combustion (reduction of oxygen to water), this formation of $H_2O_2$ constitutes a particular problem because overall electricity output is reduced.

Most $H_2O_2$ is manufactured by a well known anthraquinone process. See, e.g., Binran, 1 *Appl. Chem., Ed. Chem. Soc.* 302 (Japan 1986). Among the disadvantages of this process are that it requires the addition of numerous organic solvents, forms many unwanted by-products, and requires various separation steps. In contrast, fuel cells provide a potential means for synthesis by safely reacting $H_2$ and $O_2$ directly in a single reactor without the use of organic solvents.

Using a reactor cell design similar to fuel cells provides an environment wherein reactants are separated by an ion exchange membrane. With $H_2O_2$ synthesis, for example, it is advantageous to separate the $H_2$ and $O_2$ reactants because mixtures of the reactants are explosive, especially at higher pressures, and constitute a serious safety hazard. Separating the reactants allows relatively high pressures to be used safely, increasing the mass transfer rate of the reactants. Reactor cells also provide effective environments for the use of catalysts that are optimized for specific reactions.

However, fuel and reactor cells typically require complex electrical equipment in order to collect and transport electrons from one side of the cell to the other. This equipment is generally inappropriate for large scale manufacturing operations. Other methods require the input of external electrical energy and/or the use of corrosion resistant equipment. In addition, many reactor cells require relatively high operating temperatures (e.g. 70° C.–90° C.) in order to be effective. It would be desirable to have a method and reactor cell that does not require organic solvents, complex electrical equipment, or input of external electricity, but yet relieves the danger of explosion and is effective at room temperature.

SUMMARY OF THE INVENTION

The invention seeks to eliminate many of the difficulties indicated above. In a first aspect, this invention is a composite membrane for chemical synthesis comprising a multiphase conductive path, at least one phase of the path being a cation conductive phase and at least one phase of the path being an electron conductive phase that is dispersed internally throughout the cation conductive phase. The composite membrane may further comprise: (a) a first layer comprising an oxidizing agent; and (b) a second layer comprising a reducing agent, wherein the multiphase conductive path is positioned between, and operatively connected to, the first and second layers.

In a second aspect, this invention is a method for chemical synthesis comprising the following steps: (a) placing an electron and cation producing composition in contact with an oxidizing agent to produce at least one electron and at least one cation; (b) conducting the electron(s) and cation(s) produced in step (a) via a multiphase conductive path to an interface between a reducing agent and a composition capable of being reduced; and (c) reacting the electron(s) and the cation(s), conducted in step (b) with the composition capable of being reduced to form a reaction product.

In a third aspect, this invention is a chemical reactor comprising: (a) a composite membrane having a first layer and a second layer as defined in the first aspect of this invention; (b) an oxidizing chamber for containing an electron and cation producing composition and placing it in contact with the first layer of the composite membrane; and (c) a reducing chamber for containing a composition capable of being reduced and placing it in contact with the second layer of the composite membrane. The composite membrane is positioned between the oxidizing chamber and the reducing chamber in such a manner that the first layer of the composite membrane faces, and is operatively connected to, the oxidizing chamber and the second layer of the composite membrane faces, and is operatively connected to, the reducing chamber.

DETAILED DESCRIPTION OF THE INVENTION

A reactor cell has now been discovered that does not require complex electrical equipment or input of external electricity. The reactor cell also provides a means for effective, room temperature, $H_2O_2$ synthesis by safely reacting $H_2$ and $O_2$ directly in a single reactor in the absence of organic solvents. The reactor cell has a composite membrane comprising both electron and cation conducting materials. For purposes of this invention, any reference to "cation" also includes "proton." Thus, a cation conductive material is inherently a proton conductive material. By filling a porous electronic conductor, such as graphite cloth, carbon paper, or porous metal, with a cationically conductive material, such as a polymer of perfluorinated sulfonic acid (PFSA), the electronic conductor becomes a path to transfer electrons required to activate reactants. In addition, cationically conductive material surfaces can be coated with appropriate catalysts to increase favorability of a given reaction.

This reactor cell may be effective in performing many different chemical synthesis reactions such as: $H_2O_2$ from $H_2$ and $O_2$; $H_2SO_4$ from $SO_2$, $H_2O$, and $O_2$ (see Langer et al., "Chemicals With Power," *Chemtech* 226, 229 (April 1985)); amine dyes from organo-nitro compounds (see Spillman et al., "Why Not Make Chemicals in Fuel Cells?," *Chemtech* 176, 182 (March 1984)); and phenol from benzene (see Otsuka et al., "Direct Synthesis of Phenol from Benzene during $O_2$-$H_2$ Fuel Cell Reactions," 139 [No. 9] *J. Electrochem. Soc.* 2381 (1992)). Of these reactions, synthesis of $H_2O_2$ is currently felt to be of significant importance and shall be discussed more specifically herein. However, one skilled in the art is capable of adapting the composite membrane system of this invention to other reactions and the specific discussion of only $H_2O_2$ synthesis is not meant to limit the scope of this invention.

Specifically, a first aspect of this invention comprises a multiphase conductive path. The multiphase conductive path comprises an intimate, substantially gas-impervious, multiphase mixture of an electron conducting material with a cation conducting material wherein the electron conductive phase is internally dispersed throughout the cation conductive phase. "Internally dispersed" means that the phases, although independent and substantially continuous, are integrally intermixed such that the electron conductive phase is an interpenetrating network and not exclusively positioned external in relation to the cation conductive phase. The phrase "substantially gas-impervious" means that the mixture serves to prevent all but an insignificant amount of gas to pass through the mixture as a gas (i.e., the mixture is non-porous, rather than porous, with respect to relevant gases). In some cases, an insignificant degree of permeability to gases might be acceptable or unavoidable, such as when hydrogen gas is present.

The multiphase conductive path differs substantially, however, from "doped" materials known in the art. Typical doped materials have a small amount of a material (dopant) added to a host material such that atoms of the dopant become permanently intermingled with atoms of the host material and form a substantially single phase. In contrast, although the multiphase conductive path of the invention has an electron conductive phase internally dispersed throughout a cation conductive phase, each phase is substantially discrete and identifiable by such routine procedures as electron microscopy, X-ray diffraction analysis, X-ray absorption mapping, and electron diffraction analysis.

The cation conductive phase may comprise any material which exhibits both a sufficient cationic conductivity under the method of this invention and an ability to have the electron conductive phase internally dispersed or embedded therein. One skilled in the art is capable of determining effective cation conductive phases for performing this function. A typical cation conductive phase is an ion exchange membrane having negatively charged groups bound within the membrane. A particularly preferable cation conductive phase comprises a polymer of perfluorosulfonic acid (PFSA). For a discussion of some commonly preferred PFSA polymers, and methods of preparing such polymers, see De Vellis et al., U.S. Pat. No. 4,846,977, col. 5, lines 1–36 (incorporated herein by reference). See also A. Eisenberg and H. Yeager, "Perfluorinated Ionomer Membranes", ACS Symposium Series No. 180 (1982). An example of a commercially available PFSA polymer is NAFION™ (Aldrich Chemical Company). Additional cation conductive phases may be materials such as sulfonated styrene grafts on a polytetrafluoroethylene backbone (commercially available from RAI Research Corporation as RAIPORE™ membranes) and crosslinked sulfonated copolymers of vinyl compounds (commercially available from Ionics, Inc., as TYPE CR™ membranes).

The electron conductive phase of the membrane can be any material which exhibits sufficient electronic conductivity under the conditions of a given reaction such as porous metal or metal screen, carbon paper, graphite cloth, graphite or carbon powder, graphite or carbon fibers, or combinations thereof. The porous metal or metal screens may also be formed from one or more metals or metal compounds. Suitable metals include such metals as silver, gold, rhodium, ruthenium, palladium, nickel, cobalt, and copper. A suitable metal alloy, described by Gosser et al., U.S. Pat. No. 4,832,938 (1989) (incorporated herein by reference), comprises platinum and palladium. Depending upon the physical structure and density of each phase, a typical multiphase conductive path contains from about 1 to about 75 percent by volume (v/o) of electron conductive phase and from about 25 to about 99 v/o cation conductive phase. Materials that have a lower density or form more randomly oriented phases generally must be present in a higher percent by volume to obtain sufficient conductivity for typical reactions.

The multiphase conductive path of this invention may be fabricated by combining at least one electron conductive phase with at least one cation conductive phase and shaping the combined phases to form a dense, gas-impervious, multiphase solid membrane, sheet, film, or body. In particular, the multiphase conductive path may be prepared as follows: (a) prepare an intimate mixture of at least one material which is electronically conductive and at least one material that is cationically conductive; (b) form the mixture into a desired shape; and (c) heat the formed mixture to a temperature sufficient to form a dense and solid membrane having electron and cation conductive properties. One skilled in the art will recognize that, depending upon the materials used, pressure may also be beneficially applied in forming the dense and solid membrane. It is important to note that, as is well known in the art, non-thermoplastic, commercially available cation conductive materials may require some pretreatment before forming the multiphase conductive path. For example, before preparing the "intimate mixture" of Step (a), above, NAFION™ may be dissolved into a solution with an appropriate solvent (e.g. dimethylformamide (DMF)) as described by Martin et al., "Dissolution of Perfluorinated Ion Containing Polymers," 54 *Analytical Chemistry* 1639 (1982) (incorporated herein by reference). This solution can then be used to mix with, or impregnate, the electronically conductive material. The solvent is then evaporated, forming the desired multi-conductive path of this invention.

Another fabrication technique utilizes extrusion of the materials to form the multi-conductive path. Here, for example, graphite fibers can be mixed with a thermoplastic ion conductive or ion conductive precursor material (e.g. a polymer of perfluorosulfonyl fluoride (PFSF)) to form a mixture that can be extruded by any well-known extrusion technique to form the multiconductive path. If an ion conductive precursor material is used to mix with the electron conductive material, it is necessary to convert the precursor material into the ion conductive material. For example, in the case of PFSF, this may typically be done by treating the precursor material with a 22 v/o sodium hydroxide (NaOH)/ $H_2O$ solution at 80° C. for about 16 hours.

The composite membrane for chemical synthesis may further comprise a first layer that includes an oxidizing agent and a second layer that includes a reducing agent. The multiphase conductive path has at least a first surface and second surface. The first and second layers are separately and operatively connected, one layer to each surface. "Operatively connected" means that the first and second layers are positioned such that the multiphase conductive path is capable of conducting both cations and electrons from the first layer to the second layer. Each surface of the multiphase conductive path may or may not be distinguishable from the other surface and may be operatively connected to either of the layers as long as both cations and electrons are conducted from the first layer to the second layer.

In $H_2O_2$ synthesis, the first layer oxidizes hydrogen to protons and electrons and the second layer, in combination with the electrons produced at the first layer, reduces oxygen to oxygen ions. The first layer may comprise any catalytic material ("agent") that facilitates oxidation and the second layer may comprise any catalytic material ("agent") that facilitates reduction. One skilled in the art is capable of determining effective oxidizing and reducing agents for performing these functions. The agents may be "supported" and, as long as cations and electrons are conducted from the first layer to the second layer through the multiphase conductive path, the layers may be operatively connected by either: discrete layers attached, or adjacent, to the multiphase conductive path; or, a non-discrete layer, mixed directly into the multiphase conductive path.

Methods for depositing metallized layers on membranes are well known in the art and a skilled artisan is capable of optimizing these deposition methods to operatively connect the first and second layers to the multiphase conductive path of this invention. Examples of such deposition methods are disclosed in Nidola et al., U.S. Pat. No. 4,364,803 (1982) and Takenaka et al., U.S. Pat. No. 4,328,086 (1982). The relevant teachings of both references are incorporated herein by reference.

Particularly preferable oxidizing and reducing agents include metals and metal containing compounds. Examples of metals and metal containing compounds useful for the first layer in $H_2O_2$ synthesis include: platinum, palladium, gold, silver, mercury, ruthenium, ruthenium dioxide, nickel, nickel boride, sodium tungsten bronzes, tungsten trioxide, tungsten carbide, molybdenum sulfide, cobalt carbide, cobalt sulfide, cobalt molybdate, platinized boron carbide, copper phthalocyanine, palladium acetylacetonate, niobium, and mixed metal and spinel electrocatalysts. Further examples of potential oxidizing agents are generally discussed in Appleby et al., "Electrocatalysis of Hydrogen," *Fuel Cell Handbook* 322–35 (Van Nostrand Reinhold 1989), incorporated herein by reference. A preferred oxidizing agent in $H_2O_2$ synthesis is platinum (Pt).

Examples of metals and metal containing compounds useful for the second layer in $H_2O_2$ synthesis include: silver, nickel, gold, bismuth, palladium, copper, cobalt (see, e.g., Putten et al., *J. Chem. Soc.,Chem. Commun.* 477 (1986), incorporated herein by reference), chromium, iron, niobium-titanium, lanthanum-manganese mixtures, indium-tin oxide mixtures, praeseodymium-indium oxide mixtures, metal phthalocyanines (see, e.g., Cook et al., 137 [No. 6] *J. Electrochem. Soc.* 2007 (1990), incorporated herein by reference), metal porphyrins (see, e.g., Chan et al., 105 *J. Am. Chem. Soc.* 3713–14 (1983), incorporated herein by reference), and anthraquinone-based catalysts (see, e.g., Degrand, 169 *J. Electoanal. Chem.* 259–68 (1984), incorporated herein by reference). A preferred reducing agent for $H_2O_2$ synthesis is gold (Au).

A second aspect of this invention is a method of chemical synthesis. This method comprises, first, placing an electron and cation producing composition in contact with an oxidizing agent to produce at least one electron and at least one cation. For $H_2O_2$ synthesis using this invention's composite membrane having the first and second layers, it is necessary that the electron and cation producing composition be a hydrogen containing composition. A preferable hydrogen containing composition is, simply, $H_2$. When the electron and cation producing composition contacts the first layer of the composite membrane, the composition is oxidized. For example, with $H_2O_2$ synthesis, when $H_2$ is used as the electron and cation producing composition, the oxidizing agent (e.g. Pt), upon contact with the $H_2$, promotes oxidation to two protons and two electrons.

The method of chemical synthesis comprises, second, conducting at least one electron and at least one cation via a multiphase conductive path to an interface between a reducing agent and a composition capable of being reduced. For $H_2O_2$ synthesis, using this invention's composite membrane having the first and second layers, at least one electron and at least one cation is conducted from the first layer to the second layer through the multiphase conducting path. Electrons and cations, generated at the first layer and conducted through the multiphase conducting path to the second layer of the composite membrane, are then placed in contact with the composition capable of being reduced at an interface between the second layer and the composition capable of being reduced. The electron(s) and the cation(s) then react with the composition capable of being reduced to form a reaction product such as $H_2O_2$.

For $H_2O_2$ synthesis, the composition capable of being reduced must be an oxygen containing composition. A preferred oxygen containing composition comprises air or, simply, $O_2$. It may also be preferable for the oxygen containing composition to further comprise $H_2O$ when using this invention's composite membrane having the first and second layers. The $H_2O$ helps dilute the $H_2O_2$, thereby reducing its potential decomposition. The $H_2O$ also helps keep the composite membrane hydrated, thereby allowing good ionic conductivity. For the latter purpose, the hydrogen containing composition, described above, may also further comprise $H_2O$.

When the composition capable of being reduced is placed in contact with the layer comprising a reducing agent, and at least one electron is provided, the composition is reduced. For example, when $O_2$ is used as the composition capable of being reduced, the reducing agent (e.g. Au) and an electron, upon contact with the $O_2$, promote reduction of the $O_2$ to an anion ($O_2^-$). $H_2O_2$ may then be formed by contacting two protons ($H^+$) and another electron with the anion ($O_2^-$).

This method of chemical synthesis may, if desired, be conducted at an elevated temperature. Generally, the temperature should not exceed a temperature at which any one of the materials of the composite membrane significantly decomposes or degrades. This temperature, and the significance of composite membrane degradation, vary according to the composition of the composite membrane. One skilled in the art is capable of determining both appropriate temperatures for conducting various synthesis reactions and whether decomposition is significant. For example, by placing a gaseous $H_2$ feed in contact with a first layer having Pt deposited thereon and placing a gaseous $O_2$ and $H_2O$ feed mixture in contact with a second layer having Au deposited thereon, $H_2O_2$ synthesis is favorable using a PFSA/graphite-cloth composite membrane at a temperature of from about 0° C. to about 50° C. Preferably, the synthesis is conducted at a temperature from about 5° C. to about 20° C. A temperature in this range not only favors $H_2O_2$ synthesis, but is also far below the temperature at which this composite membrane will begin to degrade (about 200° C.).

In addition, the method of the invention is typically conducted at a pressure of from about ambient (taken as about 100 kPa) to about 14,000 kPa (about 2030 psi). It is preferred that a pressure differential between each side of the composite membrane does not exceed about 415 kPa (about 60 psi). Generally, increased pressure provides an increased mass transfer rate of the reactants. By optimizing the mass transfer rates to suit a particular reaction, a skilled artisan may increase yield of a given reaction product, For $H_2O_2$ synthesis, a particularly preferable pressure is from about 750 kPa (about 109 psi) to about 3,600 kPa (about 522 psi).

Finally, it is preferable to remove any reaction products from the second layer of the composite membrane. This isolates desirable reaction products and minimizes undesirable side reactions such as $H_2O_2$ decomposition.

A third aspect of this invention is a chemical reactor. The chemical reactor comprises the composite membrane having the first and second layers described above, an oxidizing chamber, and a reducing chamber. The composite membrane having the first and second layers is positioned between, and operatively connected to, both the oxidizing chamber and the reducing chamber such that the first layer of the composite membrane faces the oxidizing chamber and the second layer of the composite membrane faces the reducing chamber. "Operatively connected" means that the chambers are positioned such that relevant composition(s) contained therein can be placed in contact with appropriate layers forming an interface between the relevant composition(s) and the appropriate layers. "Chamber" includes any vessel, space, zone, or the like, capable of substantially containing and facilitating contact between any relevant composition and an appropriate surface of the composite membrane. Thus, an oxidizing chamber provides an effective environment for introducing, containing, and placing the electron and cation producing composition in contact with the first layer of the composite membrane. Similarly, the reducing chamber provides an effective environment for introducing, containing, and placing the composition capable of being reduced in contact with the second layer of the composite membrane. In addition, each chamber desirably has at least one opening for supply and/or removal of relevant composition(s), reaction products, or both.

The chemical reactor may further comprise a means for supplying the electron and cation producing composition to the oxidizing chamber and a means for supplying the composition capable of being reduced to the reducing chamber. Each of these means may be any conventional system or apparatus that transports relevant compositions from a source of the compositions into the oxidizing or reducing chamber. In its simplest form, each means may be a pump and a conduit or passageway operatively connected to a source of the composition such that the relevant composition is pumped from its source, through the conduit, and into its respective chamber. The chemical reactor may further comprise a similar type of means to recover reaction products, such as $H_2O_2$, from the reducing chamber.

A typical chemical reactor of this invention functions by oxidizing an electron and cation producing composition, contained in the oxidizing chamber, at an interface between the first layer and the composition, producing at least one electron and at least one cation. The electron(s) and cation(s) are then conducted through the composite membrane to the second layer of the composite membrane where the electrons contact a composition capable of being reduced, contained in the reducing chamber, at an interface between the composition and the second layer of the composite membrane, the electron(s) reducing the composition. The reduced composition then reacts with the internally conducted cation(s) to form at least one reaction product. The reaction product(s) may then be recovered from the reducing chamber by conventional means.

ILLUSTRATIVE EMBODIMENTS OF THE INVENTION

The invention will be further clarified by a consideration of the following example, which is intended to be purely exemplary of the use of the invention.

Alcohol was allowed to evaporate off of 100 milliliters (mL) of a 5 weight percent (wt %) PFSA/alcohol solution (commercially available from Aldrich Chemical as NAFION™ perfluorinated ion-exhange powder (1990–91 catalog item number 27,470-4) at room temperature and atmospheric pressure to form a PFSA residue. The PFSA residue was then dissolved in 100 mL of dimethylformamide (DMF) to form a solution of 5% PFSA/DMF. An amount of 0.085 grams of 1 micron graphite powder (available from Ultra Carbon Corporation, Item No. UCP 1-M) was then formed into a suspension with 6 mL of the PFSA/DMF solution. The suspension was then poured into a 1.5 inch (3.81 cm) diameter aluminum dish and the dish was allowed to sit at room temperature and atmospheric pressure for about 24 hours so that the DMF evaporated. After evaporation of the DMF, an approximately 100 micron thick film of multiphase conductive path containing 20% graphite carbon was removed from the dish. The film had an electronic resistivity of about 0.3 ohms.

Oxidizing and reducing catalysts were applied to approximately 6 $cm^2$ of surface area on separate sides of the film by a direct paint on (DPO) method. For the DPO method, two inks were made, one for each catalyst. Both inks were made by forming suspensions of a catalyst with a propylene carbonate vehicle and a binder. A reducing catalyst ink was made from 40% gold on carbon black (commercially available from E-Tech, Inc.). An oxidizing catalyst ink was made from 20% platinum on carbon black (commercially available from E-Tech, Inc.). The binder consisted of the same 5 wt % PFSA/DMF solution as used to form the film and it was added to each of the catalyst inks in an amount such that the weight of the catalyst on carbon black was 2.5 times greater than the weight of PFSA in the PFSA/DMF binder. The reducing catalyst ink was painted onto the film in an amount sufficient to provide a 1.0 $mg/cm^2$ metal loading and the oxidizing catalyst ink was painted onto the opposite side of the film in an amount sufficient to provide a 0.3 $mg/cm^2$ metal loading. Each ink was painted one at a time onto the composite membrane while the membrane was on a heated (about 50° C.), fritted vacuum table. The table ensured that the membrane remained flat and aided in the evaporation of the propylene carbonate and DMF. Evaporation of the propylene carbonate vehicle and DMF formed a multiphase conductive path composite membrane having an oxidizing agent layer and a reducing agent layer deposited thereon.

The composite membrane was then operatively connected into a reactor such that the oxidizing catalyst faced an oxidizing chamber of the reactor and the reducing catalyst faced a reducing chamber of the reactor. Hydrogen gas, which had been humidified with water vapor at 50° C., was contacted with the oxidizing catalyst at a pressure of about 300 kPa (about 44 psi). Oxygen gas was contacted with the reducing catalyst at a pressure of about 350 kPa (about 51 psi). The reactor was maintained within a temperature range of between 0° and 40° C. Each gas was continuously fed to its respective catalyst for a period of 4.25 hours. A reaction product was formed having a concentration of 0.05% hydrogen peroxide.

Other embodiments of the invention will be apparent to the skilled in the art from a consideration of this specification or practice of the invention disclosed herein. It is intended that the specification and example be considered as exemplary only, with the true scope and spirit of the invention being indicated by the following claims.

What is claimed is:

1. A method for chemical synthesis comprising the following steps:
   (a) placing an electron and cation producing composition in contact with an oxidizing agent to produce at least one electron and at least one cation;
   (b) conducting the at least one electron and the at least one cation produced in step (a) via a multiphase conductive path having at least a polymeric-based cation conductive phase and an electron conductive phase that is embedded throughout the cation conductive phase as a substantially continuous interpenetrating network, to an interface between a reducing agent and a reducible composition; and
   (c) reacting the at least one electron and the at least one cation conducted in step (b) with the reducible composition to form a reaction product.

2. The method for chemical synthesis of claim 1 wherein the cation conductive phase comprises a polymer of perfluorosulfonic acid.

3. The method for chemical synthesis of claim 1 wherein the electron conductive phase is selected from the group consisting of porous metals, metal screens, carbon paper, graphite cloth, carbon or graphite fibers, carbon or graphite powders, and any combination thereof.

4. The method for chemical synthesis of claim 1 wherein the oxidizing agent comprises a metal or metal-containing compound.

5. The composite membrane of claim 4 wherein the metal of the oxidizing agent is Pt.

6. The method for chemical synthesis of claim 1 wherein the reducing agent comprises a metal or metal-containing compound.

7. The composite membrane of claim 6 wherein the metal of the reducing agent is Au.

8. The method of claim 1 wherein the electron and cation producing composition is a hydrogen containing composition.

9. The method of claim 8 wherein the hydrogen containing composition oxidizes to protons and electrons upon contact with the first layer.

10. The method of claim 9 wherein the reducible composition is an oxygen containing composition.

11. The method of claim 10 wherein the oxygen containing composition is reduced to at least one oxygen ion upon contact with the second layer and at least one electron.

12. The method of claim 11 wherein the reaction product is hydrogen peroxide.

* * * * *